United States Patent
Calkins

[11] Patent Number: 6,159,583
[45] Date of Patent: *Dec. 12, 2000

[54] DECORATIVE NON-ADHERING LINER OR MAT

[75] Inventor: Mark A. Calkins, Los Angeles, Calif.

[73] Assignee: Kittrich Corporation, La Mirada

[ * ] Notice: This patent is subject to a terminal disclaimer.

[21] Appl. No.: 09/432,786

[22] Filed: Nov. 3, 1999

Related U.S. Application Data

[63] Continuation-in-part of application No. 09/064,017, Apr. 20, 1998, Pat. No. 6,022,617.

[51] Int. Cl.$^7$ .................................................. B32B 27/14
[52] U.S. Cl. ............................. 428/195; 428/95; 428/96; 428/206; 428/207; 428/323; 428/423.7; 428/424.6; 442/101; 442/401
[58] Field of Search ............................. 428/95, 96, 195, 428/206, 207, 323, 423.7, 424.6; 442/101, 401

[56] References Cited

U.S. PATENT DOCUMENTS 6,022,617  2/2000  Calkins ................................. 428/354

Primary Examiner—Deborah Jones
Assistant Examiner—Abraham Bahta
Attorney, Agent, or Firm—D. W. Eggins; D. Eggins

[57] ABSTRACT

A laminated non-slip liner or mat comprises a first lower laminate layer, the undersurface thereof having printed thereon a pattern of relatively high friction material; a second laminate upper layer of material with upper and lower surfaces is supported by the first layer, with an adhesive layer between the first and second layers, bonding the top face of the first layer to the bottom face of the second layer. The lower, first laminate layer serves as a barrier between the pattern of relatively high friction material and the adhesive. Preferably, the pattern of relatively high friction material is a high density matrix of printed latex, polyvinylchloride, or polyethylene projections which may include a tackifying agent to enhance the coefficient of friction of the projections. The second laminate layer may be a printed vinyl sheet. The improved liner or mat has the unexpected benefit of not adhering to fine finish surfaces of oil based paints, lacquers and linoleums. By making the laminated layers of substantially equal thickness, the tendency to curl, when unrolled may be substantially reduced. The lower layer can be of material selected from an extremely wide range of unwoven and woven materials, both synthetic and natural.

20 Claims, 2 Drawing Sheets

DECORATIVE NON-ADHERING LINER OR MAT

CROSS REFERENCE TO RELATED APPLICATIONS

This application is a continuation-in-part of application Ser. No. 09/064,017, filed Apr. 20, 1998, now U.S. Pat. No. 6,022,617.

BACKGROUND OF THE INVENTION

1. Field of the Invention

The present invention relates to decorative laminated non-slip liners or mats, and more particularly to an improved decorative laminated non-slip liner or mat which avoids delamination, has a lay-flat characteristic when unrolled, and has a smooth decorative surface with no discernable visual or physical surface discontinuities transferred from the underlying substrate. The laminate may be substantially non-adhering to certain susceptible finished surfaces.

2. Description of the Prior Art

Prior art decorative non-slip liners utilize frictionalizing materials foamed on a coated scrim. Such frictionalized material is then permanently laminated to a printed vinyl substrate.

The primary disadvantage of the prior art concerns the frictionalizing material layer used within the lamination process. As an example, reference is made to U.S. Pat. No. 5,707,903 to Schottenfeld. The frictionalizing material layer of Schottenfeld is created by the submersion of woven or knitted scrim in polyvinyl chloride (PVC) foaming compound. The substrate is then exposed to heat, activating blowing agents within the compound and curing the foaming compound about the framework of yarns making up the woven or knitted scrim. The inherent nature of this process is the formation of an uneven surface on both sides of the frictionalizing material layer (see FIG. 3 of Schottenfeld). The primary drawback of the frictionalizing medium is that this random uneven surface, coupled with the pattern formation of the foamed polyvinyl chloride (PVC), will visibly and physically penetrate through to the attached laminated vinyl layer, resulting in a displeasing, irregular appearance of the final product.

Another problem with the prior art is that the frictionalizing compound contains a plasticiser, i.e. an oil, used to solvate the polyvinyl chloride (PVC) resin. Plasticiser is a key ingredient within the non-slip composition, and is known to migrate within the substrate after it has been cured. The migration of this component will break down the bonding qualities of the adhesive utilized to affix a vinyl sheet to the foamed non-slip substrate. The inherently uneven face of the coated material provides limited surface area to effect a bond. This, coupled with the decomposition of the adhesive, results in eventual delamination of the two substrates. The adverse effects of plasticiser that remains active after curing also have been known to cause marring of finished surfaces covered by the liner, including lacquers, oil-based paint finishes and linoleum Yet another shortcoming of the prior art relates to its layflat characteristics. The inherently unbalanced construction of the materials presently used in the prior art prevents them from initially conforming to a flat surface (again referencing FIG. 3 of Schottenfeld), while the liner will curl in upon itself when removed from tubular packaging. This is a common phenomenon for laminated substrates of dissimilar thickness, intensified by the migratory shrinking action of adhesive, which will cure further after the lamination process. Although some adhesives have been developed to resist the adverse reaction of plasticisers, it should be noted that the physical properties of foamed PVC scrim laminated to a decorative vinyl layer will still cause the product to retain an initial roll set or memory.

Another related reference of prior art is U.S. Pat. No. 4,137,356 to Shoemaker et al. (Shoemaker). The Shoemaker place mat is constructed of a paper or plastic sheet upon each side of which is imprinted a pattern of high friction material. However, the top surface of the Shoemaker place mat is not a decorative surface, is not of laminated construction, and does not exhibit a smooth top surface, i.e., it has a number of projections effective in imparting anti-skid and anti-slip characteristics to the top of the mat to reduce slipping or skidding of glasses, dishes, and the like placed thereon.

A number of other prior art activities have addressed the issue of preventing slippage of items such as place mats, liners, and the like. In U.S. Pat. No. 5,845,144 Hawley discloses use of a frictionalizing layer of a cured aqueous dispersion of polyurethane foam, to provide a closed cell undersurface. However, such foamed polyurethanes are less durable, being subject to rolling off or rubbing damage during use and cleaning, which can lead to wrinkling and creasing of the liner or mat with normal usage. Also, its electrostatic properties attract dust and grime. Accordingly, the need remains for an improved decorative non-slip liner.

SUMMARY OF THE INVENTION

The present invention addresses certain shortcomings and problems associated with the prior art. In accordance with the invention, there is provided a laminated non-slip liner or mat, comprising: a bottom or first laminate layer of material having a first, top surface and a second, under surface, the second surface having printed thereon a pattern of relatively high friction material; a top, or second, laminate layer of material having a first surface and a second surface; and an adhesive between the first and second layers, bonding the first layer first surface to the second layer second surface, wherein the first layer serves as a barrier between the high friction material and the adhesive. Thus, with this construction, the first laminate layer of material acts as a barrier between the pattern of relatively high friction material and the adhesive.

It will be understood that the invention may be implemented in the form of a decorative non-slip shelf or drawer liner, or in the form of a decorative non-slip mat such as a coaster or place mat. In this specification, an example of a decorative non-slip liner will be described for convenience.

Preferably, the pattern of relatively high friction material is a high density matrix of printed latex or polyvinyl chloride projections in a dot configuration. It has been found that polyethylene may also be used as the high friction printed material, the desired frictional characteristic being obtained by the inclusion of a tackifying agent with the polyethylene. This provides for substantially non-marring contact upon vulnerable surfaces such as lacquers, oil-based paints and linoleums.

Color may be added with the dot matrix material.

As regards the printed matrix, asymmetrical or random arrangement of any one of a number of other geometric configurations of the projections is acceptable, provided such projections are laid out in a high density pattern to substantially preclude the formation of unevenness at the gluing interface with the superimposed laminate.

The present invention thus provides a first, under layer laminate material selected from the group consisting of spun bound nonwoven polyester, spun bound natural or synthetic fibrous material, paper, plastic sheet material, natural or synthetic sheet material, and plastic-coated paper sheet, point bonded, needle pointed and hydro-entangled nonwovens of polyester, rayon and polypropylene, and blends thereof, and woven natural and/or synthetic fibers, the layer having a pattern of high friction material applied to the undersurface thereof. A spun-bound polyolefin (Tyvec T.M.) material may also be used for the under layer. The top, or second, laminate layer is typically a printed decorative vinyl sheet having smooth first and second surfaces.

By use with the underlayer substrate of a close configuration of the printed high friction projections, the upper surface of the laminate underlayer is smooth, i.e. continuous and without surface discontinuities, for effecting full surface area contact with the adhesive and the usually unprinted under-surface of the top sheet laminate layer.

Additionally, if a softer feel is desired for the decorative non-slip liner, the relatively high friction material may be selected from a foamed latex or foamed polyvinyl chloride resin.

The upper layer of the laminated structure may include sheet material of decorative polyester or polypropylene, plastic coated paper and printed type sheets.

In order to minimize the curling effect seen in many of the prior art non-slip liners, the construction of the present invention permits the nonwoven substrate layer and the decorative overlying sheet layer to be of approximately the same thickness.

Other variations and alternatives may readily occur to those skilled in the art, and lying within the scope of the claims hereof

BRIEF DESCRIPTION OF THE DRAWINGS

Certain embodiments of the present invention are described by way of example, without limitation of the invention thereto, otherwise than as set forth in the claims hereof, reference being made to the accompanying drawings, wherein:

DETAILED DESCRIPTION OF THE INVENTION

Figure 1:
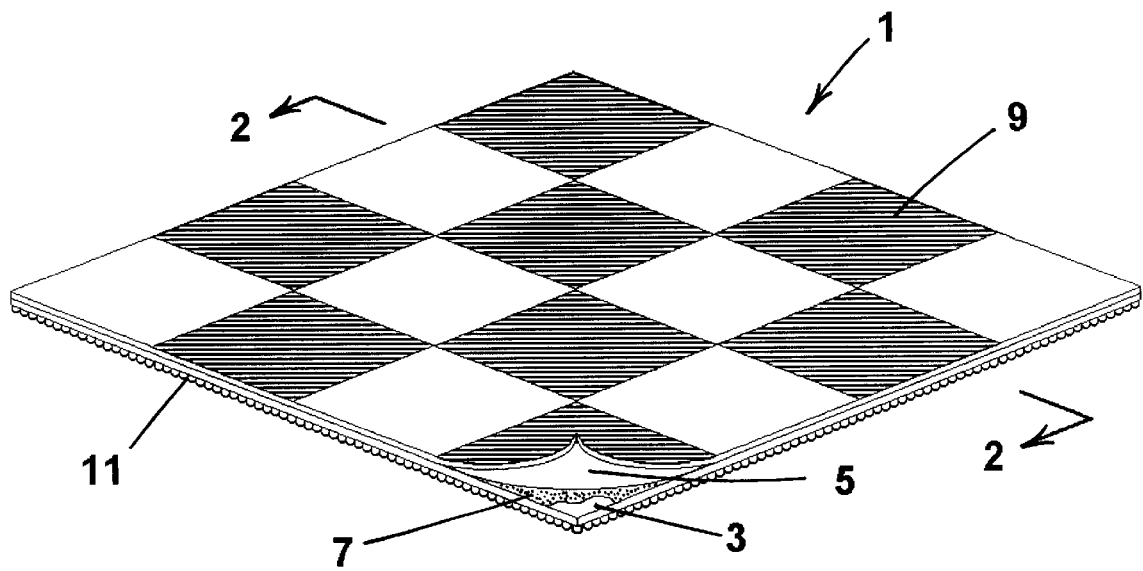
FIG. 1 is a perspective view of a decorative non-slip liner constructed in accordance with the present invention, having one corner delaminated to show the two-layer, i.e. laminated, construction.

Referring to FIG. 1, a laminated non-slip liner 1 made in accordance with the present invention, comprises a substrate defined by a first laminate layer 3 of material having an upper, or first, surface 13 and a lower, or second, surface 15. The lower surface 15 has printed thereon a pattern of relatively high friction material shown in FIG. 2 as closely packed dots 11.

The liner 1 further includes a second, upper laminate layer 5, preferably a decorative vinyl sheet, having an upper, or first surface 17 and a lower, or second, surface 19. The second laminate layer 5 has imprinted therein, or on the upper surface 17 a decorative image 9.

The two laminate layers 3 and 5 are joined in facing relation by an adhesive layer 7.

Figure 2:
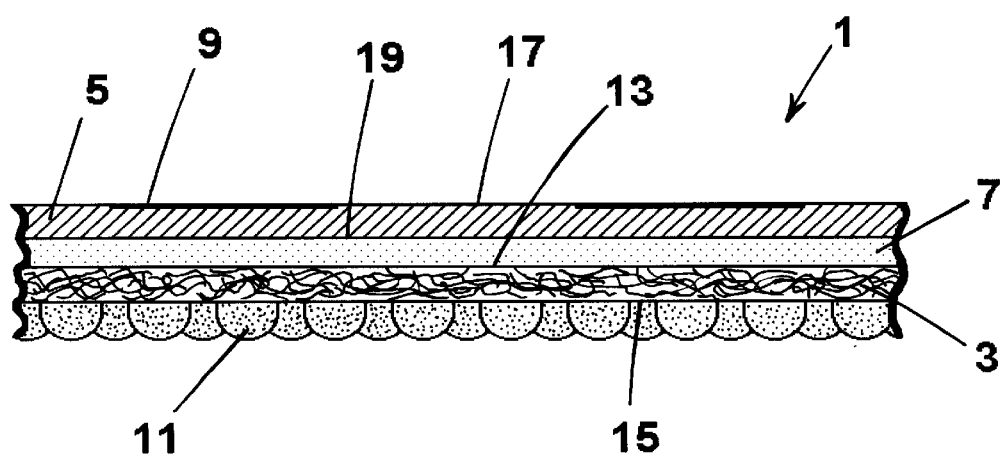
FIG. 2 is a partial cross sectional view taken along the line 2—2 of FIG. 1.

It will be observed from FIG. 2, a cross sectional view taken along the line 2—2 of FIG. 1, that the upper surface 13 of the bottom layer 3 is smooth and planar. Similarly, the lower surface 19 of the top laminate layer 5 to be adjoined thereto is likewise smooth and planar. As a result, although the pattern of relatively high friction structures 11 (e.g. printed latex polyvinyl chloride (PVC) or polyethylene dots) are discontinuous along the lower surface 15 of the substrate 3, the discontinuous pattern of dots 11 does not impart any visible or physical distortions of the vinyl sheet top layer 5. Thus, the top decorative vinyl sheet 5 will retain a smooth appearance, while the bottom non-slip frictionalized surface 15 of the lower layer 3 provides effective slip protection for the non-slip liner.

Figure 3:
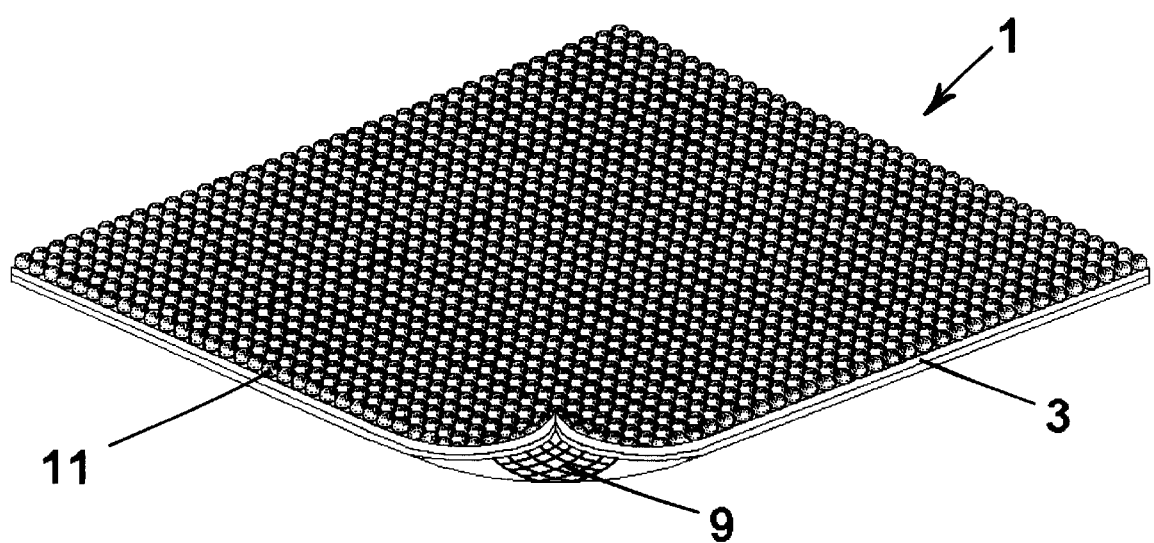
FIG. 3 is a perspective view of the underside of a decorative non-slip liner constructed in accordance with the present invention with one corner turned up to show a portion of the topside.

FIG. 3, a perspective view of the underside of the decorative non-slip liner 1 with one corner turned up, shows a portion of the topside surface 17. The compact pattern of high friction dot structures 11 evident in this view are illustrated as being a symmetrical. arrangement.

It is to be understood, however, as noted above, that other asymmetrical or random arrangements of projections, having geometric sections other than the illustrated configuration may be chosen and prove equally acceptable, in maintaining a smooth topside surface 17, an important feature of the present invention.

The present invention is a departure from the prior art, in that it incorporates the controlled formation of frictionalizing materials 11 upon one side, the lower surface 15, of a liner substrate 3 which may be of smooth nonwoven, spun bound, polyester. The substrate 3 is printed with a series, or matrix, of polyvinyl chloride (PVC) projections, e.g. "dots" 11, or other frictionalizing material in a suitable close pattern to effect maximum surface resistance. The on-printing of the non-slip compounds produces predictable results and eliminates the random uneven surface caused by the methods employed in the prior art. The unprinted side 13 of the frictionalized nonwoven substrate 3 is then permanently laminated to the reverse side 19 of a decoratively printed upper sheet 5, preferably of vinyl.

The construction of the present invention serves to minimize the delamination characteristics present in known prior art non-adhesive, non-slip decorative liners. The frictionalized material 11 does not come into contact with the adhesive layer 7 of the liner according to the present invention. The substrate 3 thus acts as a protective barrier between these two components, and therefore, the bonding qualities of the laminating adhesive are not adversely affected by any migratory characteristics of plasticiser within the chosen frictionalizing resin for the printed projections 11. Moreover, unlike the prior art, substantially the full planar surface area 13 of the liner substrate 3 comes into adhesive contact with the lower planar surface 19 of the attached decorative upper sheet 5. Since more surface area is utilized, as compared, for example, with the liner construction according to the aforementioned Schottenfeld patent, a stronger laminating bond is formed than could previously be achieved by the open cell construction of that prior art.

An additional feature of the present invention is an embodiment utilizing printed foamed polyvinyl chloride (PVC) as the frictionalizing agent in the construction of the printed projections 11 on the undersurface of substrate 3. The printed polyvinyl chloride (PVC) projections 11 can be pigmented with a variety of colors.

Yet a further benefit of the present invention is the superior lay-flat characteristics it has over the prior art. A balanced construction is achieved due to the construction wherein the underlying substrate 3 is of a similar thickness to the overlying vinyl sheet 5 attached thereto. The use of a fibrous nonwoven material for substrate 3 allows the finished product greater flexibility, to diminish roll set or memory when it is taken out of packaging.

In summary, the present invention provides a number of advantages over prior art non-slip liners. For example, the present invention avoids delamination, due to the fact that the frictionalized material 11 does not come into contact with the adhesive layer 7. Additionally, full surface contact is made between the lower substrate 3 and the decorative vinyl sheet 5, the interfacial surfaces of these two laminate layers being smooth, continuous and substantially planar. In one embodiment, the frictionalizing agent is foamed printed polyvinyl chloride (PVC). Alternatively, latex or polyethylene with a tackifier may be used as the frictional agent. Additionally, the liner of the present invention exhibits exceptionally good lay-flat characteristics when the selected thicknesses of the lower substrate and the top vinyl sheet are approximately the same.

Finally, due to the smooth, continuous surfaces joined by the adhesive layer 7, there is no discontinuous surface contact between the lower substrate 3 and the upper sheet 5, and therefore there is no visible or physical transfer of the surface characteristics of the lower layer 3 through to the lamination upper layer 5 attached thereto.

While only certain embodiments of the invention have been set forth above, alternative embodiments and various modifications will be apparent from the above description and the accompanying drawing to those skilled in the art. For example, if desired, there need not be a pattern or design 9 in the top layer 5, or there may be a pattern on the lower surface 19 of the top layer 5, or the pattern or design in the top layer 5 may extend completely through it. The laminated non-slip liner 1 may be manufactured in a large or long sheet, in roll form, in rectangles, or in narrow strips, depending on need. If desired, the shapes of the bottom and top layers 3, 5 may be of different patterns. For example, using a paper, plastic, or plastic covered paper bottom layer 3, and applying adhesive only on the lower surface 19 of the top layer 5, a scalloped top layer 5 may be fitted centrally onto a rectangular bottom layer 3 of larger dimensions, thereby providing a decorative non-slip mat arrangement. These and other alternatives are considered equivalents and within the spirit and scope of the present invention.

What is claimed is:

1. A laminated non-slip, non-adhering liner or mat, comprising:
   a first laminate layer having a first surface and a second, under-surface, the under-surface having printed thereon a pattern of relatively high friction material;
   a second laminate layer of material having a first surface and a second surface; and
   an adhesive between the first and second layers, bonding said first layer first surface to said second layer second surface, wherein said first layer serves as a barrier between said high friction material and said adhesive; and said high friction material consists of polyethylene, to provide substantially non-adhering, non-marring contact with an underlying, vulnerable surface.

2. The laminated non-slip liner or mat as claimed in claim 1, wherein said pattern of relatively high friction material is a high density matrix of printed projections of material incorporating a tackifying agent therewith, to enhance said high friction characteristic.

3. The laminated non-slip liner or mat as claimed in claim 2, wherein said projections have a configuration selected from the group consisting of random and geometric dot configurations.

4. The laminated non-slip liner or mat as claimed in claim 1, wherein said first laminate layer is selected from the material group consisting of spun bound nonwoven polyester, spun bound natural fibrous paper and spun bound synthetic fibrous paper, plastic sheet, natural and synthetic sheet, plastic-coated paper sheet, point bonded, needle-pointed and hydro-entangled non-wovens of polyester, rayon and polypropylene, and blends thereof, and woven natural and sythetic fibers.

5. The laminated non-slip liner or mat as claimed in claim 1, wherein said second laminate layer is a printed vinyl sheet.

6. The laminated non-slip liner or mat as claimed in claim 5, wherein said second laminate layer is a decorative plastic sheet, wherein said first and second surfaces are smooth, said plastic being selected from the group consisting of vinyl, polyester, propylene, plastic coated paper and printed spunbound polyolefin (Tyvec T. M.) sheet.

7. The laminated non-slip liner or mat as claimed in claim 5, wherein: said first surface of said printed vinyl sheet has decorative imprinting thereon; and said second surface of said printed vinyl sheet is adhered to said first surface of said first laminate layer.

8. The laminated non-slip liner or mat as claimed in claim 6, wherein said first layer first surface and said second layer second surface are substantially planar and unblemished, to provide full surface area contact of said adhesive with the surfaces of said first and second layers.

9. The laminated non-slip liner or mat as claimed in claim 2, wherein said projections are pigmented with color.

10. The laminated non-slip liner or mat as claimed in claim 2, wherein said polyethylene projections include a tackifying agent, to enhance the coefficient of friction of the projections.

11. The laminated non-slip liner or mat as claimed in claim 1, wherein said first and second laminates are of substantially equal thickness, to diminish curling of the liner when unrolled.

12. The laminated non-slip liner or mat as claimed in claim 1, wherein said relatively high friction material is a foamed elastomer selected from the group consisting of latex, polyvinyl chloride and polyethylene resin.

13. The laminated non-slip liner or mat as claimed in claim 1, wherein said relatively high friction material initially includes a blowing agent to provide cushioned support to said second laminate layer.

14. The laminated non-slip liner or mat as claimed in claim 1, wherein said first and second laminate layers differ from each other in shape.

15. The laminated non-slip liner or mat as claimed in claim 1, wherein said first and second laminate layers differ from each other in size.

16. A laminated non-slip liner or mat, comprising:

a first laminate layer of frictionalized printed spun bound nonwoven polyester material; and a second laminate layer of printed vinyl adhesively attached to said first laminate layer.

17. The laminated non-slip liner or mat as claimed in claim 16, wherein said second laminate layer is adhesively bonded to said first laminate layer with substantially continuous and full surface area contact between respective adjacent planar surfaces of said first and second laminate layers.

18. The laminated non-slip liner or mat as claimed in claim 2, wherein said printed projections are substantially non-adhering to finished surfaces selected from the group consisting of oil based paints, lacquers and linoleums.

19. The laminated non-slip liner or mat as claimed in claim 18, wherein said printed projections are of polyethylene, having a tackifying agent included therewith.

20. The laminated non-slip liner or mat as claimed in claim 3, wherein said printed projections are substantially non-adhering to finished surfaces selected from the group consisting of oil based paints, lacquers and linoleums.

* * * * *